Jan. 16, 1934.  G. J. HARRIS  1,943,762
PACKAGING AND DISPLAY MEANS
Filed Aug. 23, 1932   5 Sheets-Sheet 1
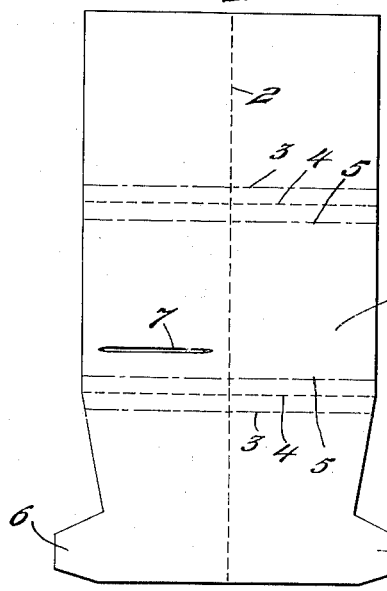
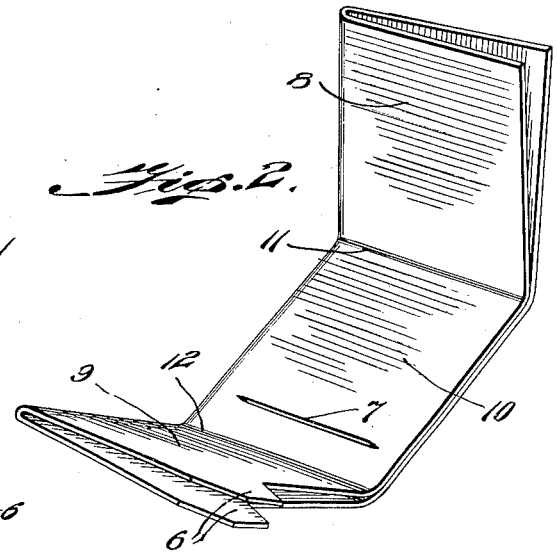
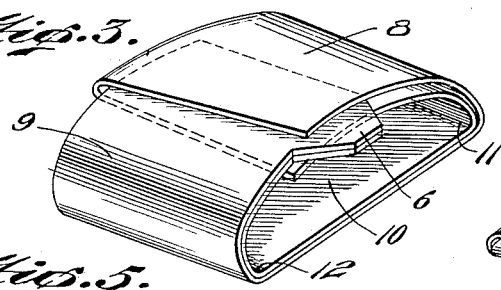
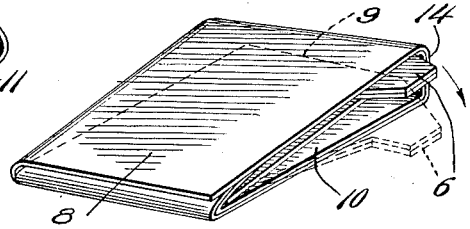
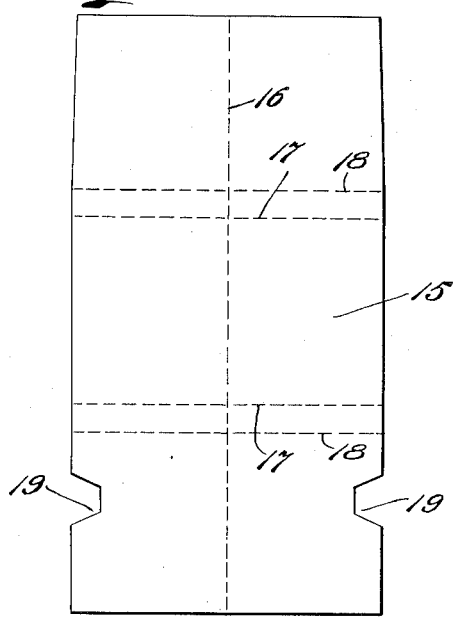
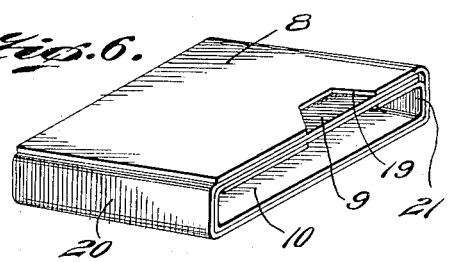
Inventor
George J. Harris
By Perley H. Plant
Attorney

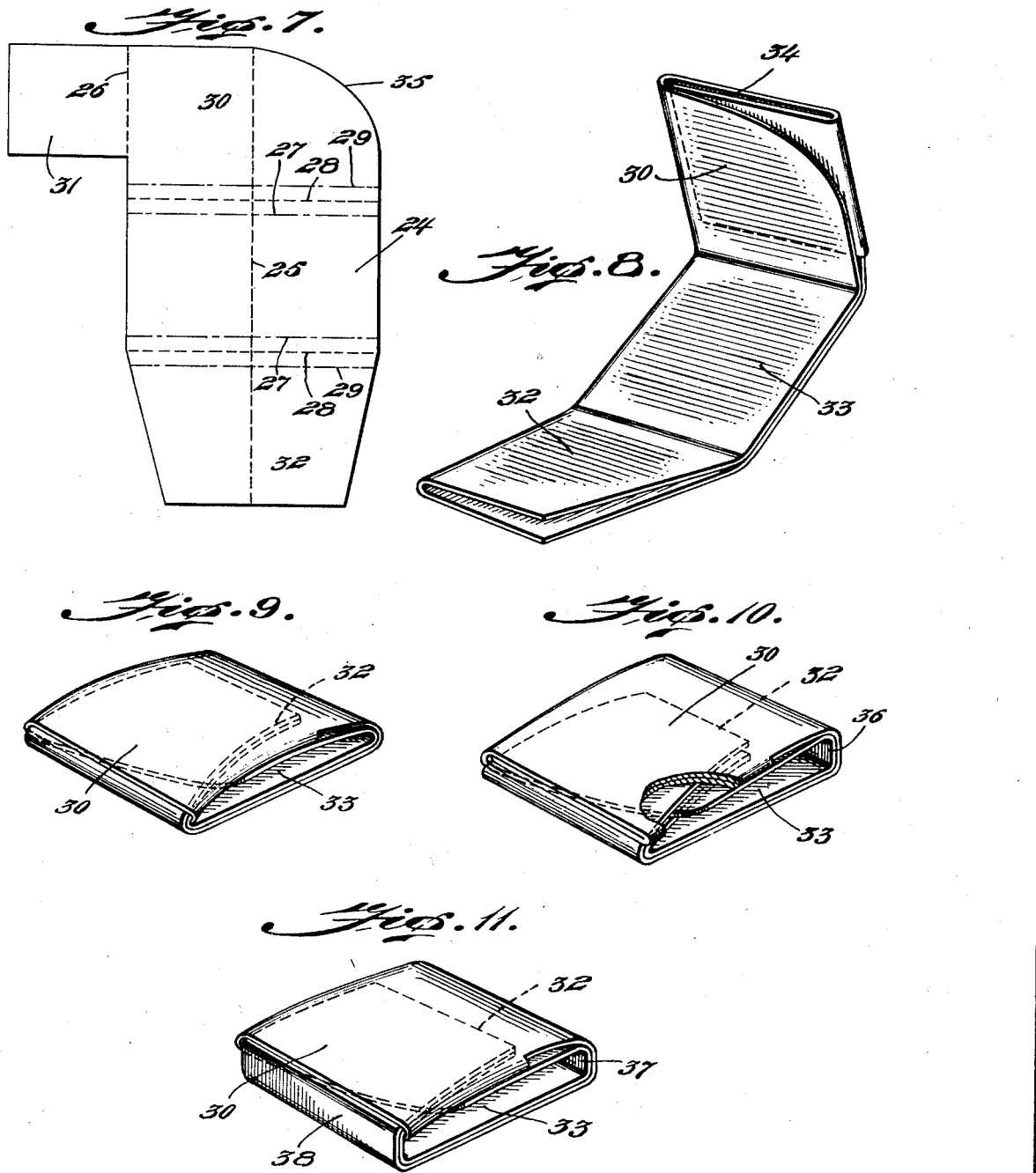

Jan. 16, 1934.    G. J. HARRIS    1,943,762
PACKAGING AND DISPLAY MEANS
Filed Aug. 23, 1932    5 Sheets-Sheet 3
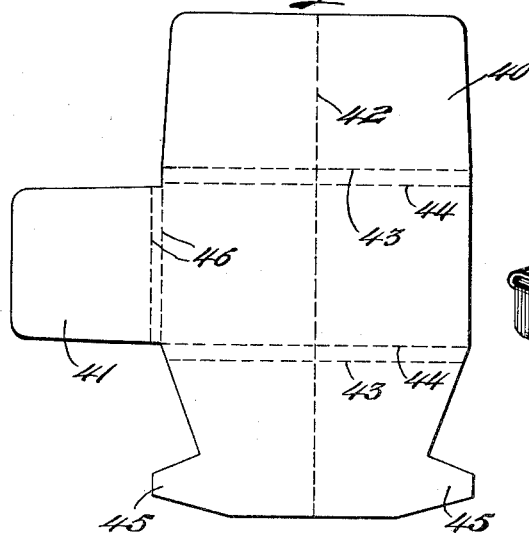
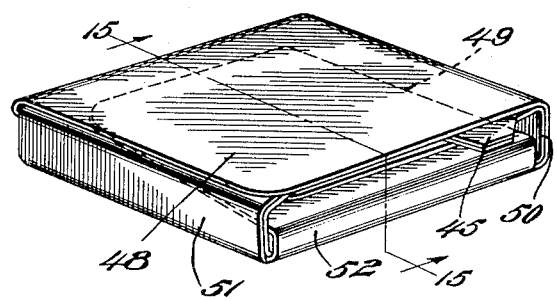
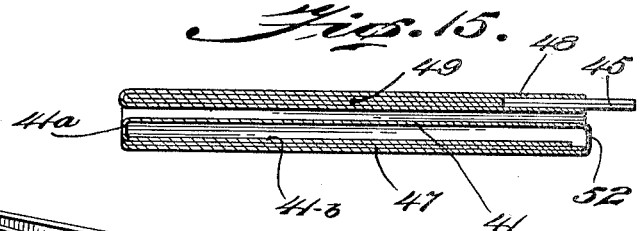
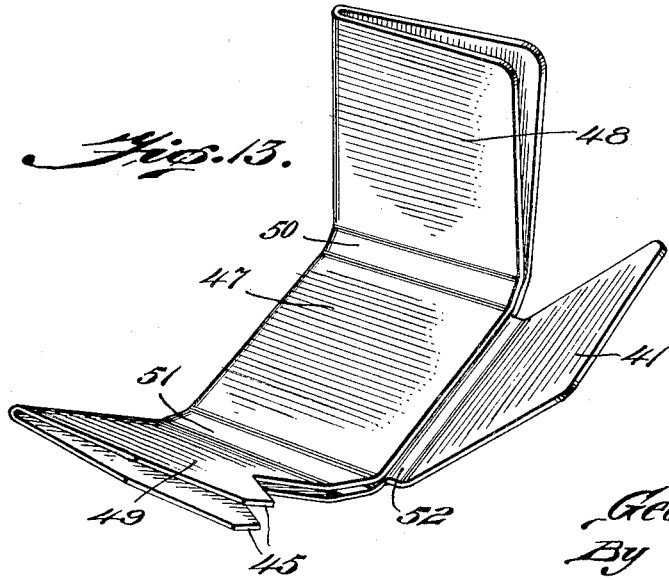
Inventor
George J. Harris
By Perley H. Plant
Attorney Jan. 16, 1934.  G. J. HARRIS  1,943,762
PACKAGING AND DISPLAY MEANS
Filed Aug. 23, 1932    5 Sheets-Sheet 4
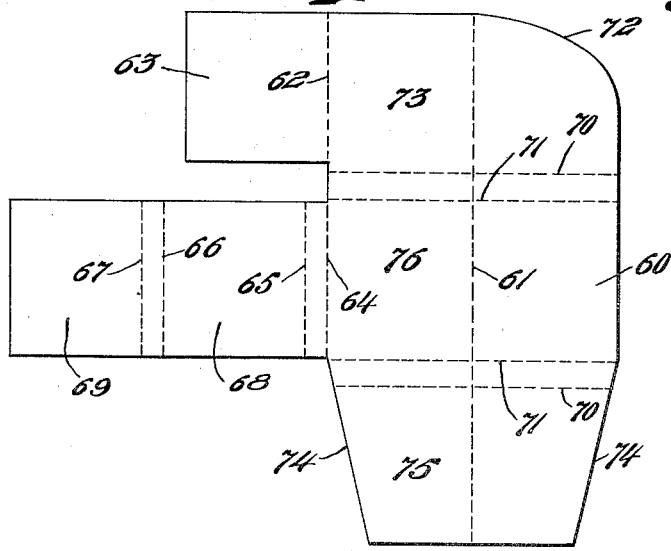
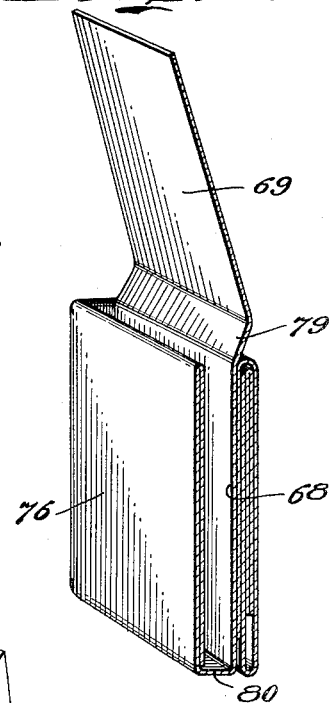
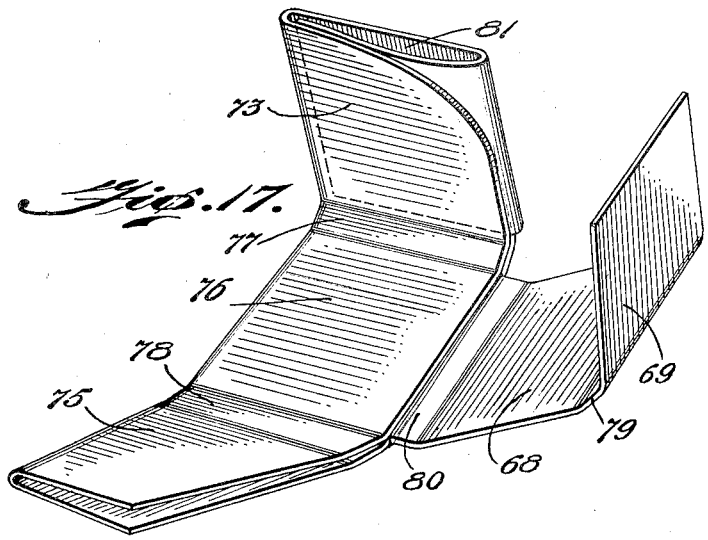
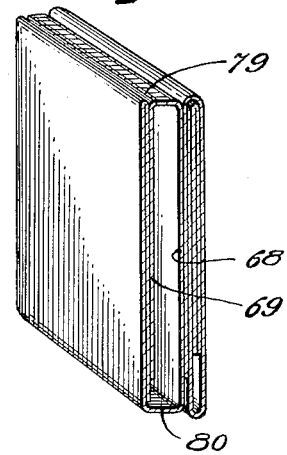
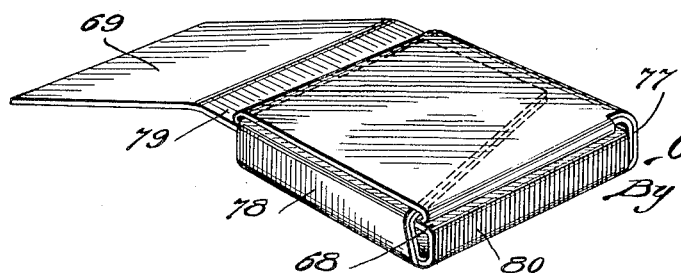
Inventor
George J. Harris
By Perley H. Plant
Attorney

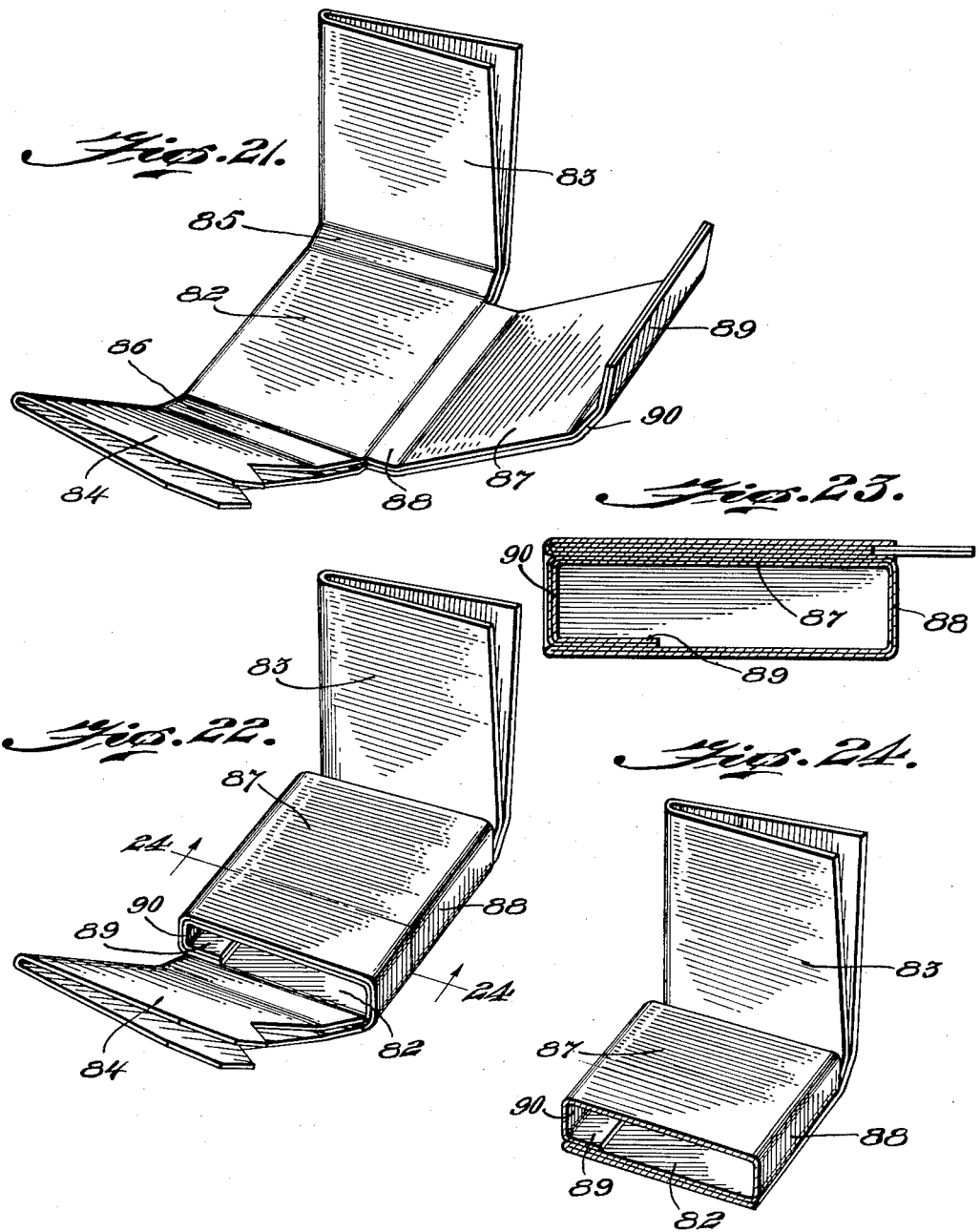

Patented Jan. 16, 1934

1,943,762

UNITED STATES PATENT OFFICE 1,943,762

PACKAGING AND DISPLAY MEANS

George J. Harris, Providence, R. I., assignor of one-third to Morris L. Harris, Providence, R. I., and one-third to Harold C. Osler, Boston, Mass.

Application August 23, 1932. Serial No. 630,008

7 Claims. (Cl. 229—87)

This invention relates to an improved packaging and display means and method of making the same adapted for use in connection with the packaging or retention of a variety of merchandisable articles in such a manner as to permit the display of or ready access to such articles when desired.

One object of the invention is the provision of an improved packaging means of the character described comprising a simple and efficient form of package provided with a closure device for maintaining the article-containing or supporting portion of the package in closed position to retain articles therein, while the closure means is adapted to be readily opened to display the packaged article or permit access thereto.

Another object of the invention is the provision of a packaging means formed from a single sheet of material having the parts so constructed and arranged as to permit the formation of the package from the sheet in such a manner that the portions of the package normally exposed to view are restricted substantially to one face of the formed sheet, whereby the formed sheet may be cut from material having a finished or printed surface and an unfinished or unprinted surface and so folded that the finished or printed surface only is exposed to view in the completed structure.

A further object of the invention is the provision of a packaging means of the character described formed from a single sheet of relatively stiff material folded longitudinally to provide a central section and opposite end sections, each having at least a double thickness of material, and so constructed as to permit the ready interposition of one end section within the opposite end section to form in substance a positive interlock for holding the parts in interfolded position.

Another object of the invention is the provision of an interfolded packaging means of unitary construction having the parts so constructed and arranged as to positively retain the structure in folded position while permitting separation of the holding means to allow access to the enclosed material.

A further object of the invention is the provision of a packaging means comprising oppositely positioned sides spaced from each other throughout a substantial portion of their extent and means inherent in one of such sides for assisting in retaining the packaging means in its closed position.

Another object of the invention is the provision of a packaging means for forming an enclosing container from a single sheet of material provided with interfitting, interlocking end portions so shaped and arranged that they are normally held in locking position through the position of the parts and the rigidity inherent in the material itself.

A further object of the invention is the provision of a unitary packaging means of the character described capable of assuming the form of a flat or rectangular shaped tube for the retention, support and display of merchandise, or adapted to be constructed in the shape of a rectangular case or container by means of suitable folding portions, the structure in either case being capable of being locked into merchandise holding position by means of separable interfitting portions of the structure.

Another object of the invention is the provision of an enclosed box-like container formed from a single sheet of material, so constructed that the exposed surfaces of the container comprise a single surface of the sheet-material, and in which one side of the box-like container may be opened to display merchandise or may be closed to form a complete inclosure therefor.

Other objects and advantages of the invention relate to various improved details of construction and novel arrangements of the parts as will be more fully set forth in the detailed description to follow.

Referring to the drawings:

Fig. 1 is a plan view of a blank sheet which may be employed in shaping one form of the packaging means, Fig. 2 is a perspective view of the blank sheet shown in Fig. 1, illustrating the position of the parts when the opposed sides of the blank sheet have been folded together along substantially the median line prior to the connection of the end sections, Fig. 3 is a perspective view showing the position of the parts during the process of connecting the end sections to produce a form of packaging means which in its final condition presents the appearance of a flattened tube, Fig. 4 is a perspective view of a modified form of packaging means such as may be produced from the sheets shown in Fig. 1 and Fig. 2, the packaging means in this case being of wedge-shaped appearance when completed.

Fig. 5 is a plan view of a slightly modified form of sheet which may be employed in forming the packaging means.

Fig. 6 is a perspective view of a form of the completed packaging means such as may be produced from the sheet shown in Fig. 5 after the intermediate step of folding as shown in Fig. 2, the final shape of the completed packaging means being substantially that of a rectangular tube.

Fig. 7 is a plan view of a blank sheet such as is adapted to be employed in the formation of the packaging means, Fig. 8 is a perspective view of the sheet blank shown in Fig. 7 illustrating the position of the parts when the same has been partially folded for producing the completed structure as shown in Figs. 9, 10 and 11, Fig. 9 is a perspective view of one form of the invention, as made from a sheet blank as shown in Fig. 7, when the end sections have been interconnected in such a manner as to provide a packaging means the cross-sectional shape of which is substantially that of a flattened tube, Fig. 10 is a perspective view of a modified form of packaging means as constructed from the blank sheet shown in Fig. 7, wherein one end wall is provided in the completed structure to give the same a wedge-shaped appearance, Fig. 11 is a perspective view of a further modified form of packaging means as constructed from the blank sheet shown in Fig. 7, wherein the final appearance of the packaging means is substantially that of a section of a rectangular tube, Fig. 12 is a plan view of another form of blank sheet such as may be employed in forming a somewhat modified form of packaging means, Fig. 13 is a perspective view illustrating the position of the parts of the blank sheet as shown in Fig. 12, after the same has been partially folded in the formation of the packaging means, Fig. 14 is a perspective view of the completed packaging means produced by completing the interfolding of the parts of the blank sheet shown in Fig. 12 of the drawings, Fig. 15 is a sectional view, taken substantially along the line 15—15 of Fig. 14, and illustrating the arrangement of the parts in a packaging means constructed similarly to that shown in Fig. 14 but differing therefrom in having the side extension member constructed of greater length so as to be capable of being further folded into the interior of the packaging means, Fig. 16 is a plan view of a further modified form of blank sheet such as is adapted to be used in connection with the formation of another form of the packaging means, Fig. 17 is a perspective view of the sheet blank shown in Fig. 16 illustrating the position of the parts when the same has been partially folded in the formation of the complete packaging means, Fig. 18 is a perspective view of the structure as formed from the sheet blank shown in Fig. 16, when the end sections have been folded over the extended portion of the central section and interlocked together, Fig. 19 is a sectional view of the structure shown in Fig. 18 and illustrating the position of the parts when the box-like packaging means is partially open or so formed as to display a portion of its contents, Fig. 20 is a sectional view of the structure shown in Figs. 18 and 19 after the extension end portion of the central section has been infolded within the structure to form a complete box-like container, Fig. 21 is a perspective view illustrating the intermediate position of the parts in interfolding a slightly modified form of sheet blank to form a completed packaging means, Fig. 22 is a perspective view of the structure after the extension portions of the central sections have been folded down and prior to the interconnection of the end sections to form the interlocking closure, Fig. 23 is a transverse sectional view of the completed packaging means, as shown in Fig. 22, after the connection of the end sections to form an interlocking closure, and, Fig. 24 is a perspective view, partially broken away, and illustrating an intermediate form, similar to that shown in Fig. 22, of a slightly modified construction in which the extension member carried by one portion of the central section is omitted.

In that form of the invention illustrated in Figs. 1 to 4 of the drawings, 1 designates a blank sheet which may be formed from cardboard, leather, leatherette, or other suitable stiff or semi-stiff material, possessing a reasonable degree of stiffness, and which may be provided with a longitudinally extending fold line 2 located substantially medianly of the sheet. The sheet may also be provided with corresponding creases 3, 4 and 5 oppositely positioned relative to each other and correspondingly arranged with reference to the longitudinal end edges of the sheet. The sheet may also be provided with edge extensions or tabs 6 located adjacent to one end of the sheet and positioned upon opposite sides thereof. An incision 7 may be formed upon one side of the sheet for a purpose which will be more fully set forth hereinafter.

In constructing the packaging means from the blank 1 the opposite sides of the blank sheet are folded over upon each other, as along the median line 2, and the end sections 8 and 9 of the shape thus produced may then be bent or rolled, in the formation of the structure shown in Fig. 3, at 11 and 12 respectively, substantially along the lines of fold 4, and the packaging means is then completed by interposing the folded end section 9 between the portions of the end section 8, after a manner similar to that shown in Fig. 3, and pressing the parts together to the extent desired into substantially the form of a flattened or partially flattened tube. In the formation of the structure shown in Fig. 4, the folding of the blank may be performed in a manner similar to that previously described, except that at one end, as shown in Fig. 2, the blank is bent or rolled along the creases 3 and 5, while at the opposite end the blank may be bent or rolled as along the crease 4. This manner of forming the folds is adapted to produce the squared end 14 at one end of the completed structure while at the opposite end the material may be bent or rolled along the single crease 4 so as to form a rounded or flattened end portion.

The tabs 6 as shown in Figs. 1 to 4 inclusive may be employed to assist in opening or closing the interlocking end sections when it is desired to open the package to remove or display the material or to close the same in forming the closed package.

The incision line 7 formed in a portion of the sheet blank may be employed for the purpose of inserting therein a portion of an article or articles which are to be contained within the package or held in display position, such for example as the usual form of safety matches, and the incision 7 may be located upon any desired portion of the folded blank as may be found convenient for supporting the article desired to be packaged.

While the packaging devices shown in Figs. 3 and 4 are described as formed from the sheet blank shown in Fig. 1, it is to be understood that these or similar forms of packaging devices may also be constructed from that form of sheet blank shown in Fig. 5, and that conversely the packaging device as shown in Fig. 6, may be formed from the sheet blank as shown in Fig. 1.

In that form of the structure illustrated in Figs. 5 and 6 of the drawings, the sheet blank 15 is provided with a median fold line 16 and transverse creases 17 and 18, along which the sheet blank may be folded or rolled to produce a form of package similar to that illustrated in Fig. 6. In the structure shown in Figs. 5 and 6 the sheet blank is provided with oppositely positioned edge recesses 19 formed in that end section of the foldable blank which receives the opposite end section, whereby a portion of the opposite end section may be readily grasped to facilitate the insertion or separation of the interlocking ends. The completed structure as shown in Fig. 6 comprises a central section 10 and oppositely positioned interfitting end sections 8 and 9 forming one side of the package, together with intermediate sections 20 and 21 forming the ends of the package.

In that form of the invention shown in Figs. 7 to 11 inclusive, 24 designates a sheet blank provided with a median fold line 25, a second longitudinal fold line 26, and oppositely positioned transverse creases 27, 28 and 29. In this form of the invention the end section 30 of the blank is provided with an extension member 31, and the end section 32 has the side edges tapered to produce a tapering end section. In forming the completed structure shown in Fig. 9, the blank 24 is first folded along the lines 25 and 26 to form a folded blank. The folded blank may then be bent or rolled as along the opposite transverse fold lines 28 to form a central section 33 and interfitting end sections 30 and 32. The end section 32 may then be forced within the opening 34 in the end section 30 and the parts pressed together to provide a packaging device shaped in the form of a partially or wholly flattened tube, as shown in Fig. 9 of the drawings, having one side portion thereof formed by the central section 33 and the opposite side portion formed by the interlocking end sections 30 and 32. In this form of the invention one end portion of the blank 24 is rounded as at 35 to permit the infolding of the end sections without having too great an amount of material in the interfolded side of the package.

In folding the sheet blank 24 to form the packaging device shown in Fig. 10, the blank may be folded as above described except that the portion of the blank adjacent to the end section 30 is bent or rolled twice, as along the creases 27 and 29, to form an intermediate section 36 between the central section 33 and the folded over end section 30, which serves as an end wall for the completed package. In interfitting the end sections 32 and 30 together to form one side wall of the packaging device, the end section 32 is shown herein as being interposed between the extension member 31 and the innermost layer of the end section 30, instead of being forced within the opening 34 previously described. This manner of interfitting the end sections is similar to that illustrated in Figs. 1 to 6 of the drawings, and is shown herein as an optional method of connecting the end sections such as may be employed with the present form of wrapper structure whenever it is found desirable.

In folding the sheet blank 24 to form the construction shown in Fig. 11 of the drawings, the folded blank 24 may be bent or rolled twice at each end, as along the creases 27 and 29, to form intermediate end sections 37 and 38 spacing the central section 33 from the interfolded end sections 30 and 32.

In that form of the invention illustrated in Figs. 12 to 15 inclusive, the sheet blank 40 employed is similar to that shown in Fig. 1 except that it is provided with a laterally projecting extension 41 which extends laterally from the central section when the blank is folded along its median line. The blank 40 may be provided with a median fold line 42 and transverse creases 43 and 44 similarly positioned relative to the opposite ends of the blank, and is also provided with oppositely positioned tabs 45 located adjacent one end of the blank. In forming the packaging device the blank 40 may be folded along its median line of fold 42 as well as along the creases 46 for the extension, and the doubled blank may then be bent or rolled along the creases 43 and 44 to assume the form shown in Fig. 13 of the drawings which comprises the central section 47, end sections 48 and 49 and intermediate sections 50 and 51, as well as the extension 41 and its connecting fold 52. The partially folded blank shown in Fig. 13 is then further folded by folding in the extension 41 and then folding over the end sections 48 and 49 and at the same time inserting the end section 49 within the folds of the end section 48 to provide an interlocking means for holding the parts firmly together and provide a rectangular case having the central section 47 as one side thereof, the interconnected end sections 48 and 49 as the other side, and intermediate sections 50 and 51 as the end portions, while the connecting fold 52 of the extension 41 serves as a closure or partial closure for one of the side edges.

In that form of the invention shown in Fig. 15 one side of the completed structure is formed by the central section 47 while the interfolded end sections 48 and 49 serve to provide the opposite side wall of the structure. In this form of the invention the extension member 41 is extended to provide an end fold 41a and a portion 41b which is adapted to be further infolded, as shown in Fig. 15, so as to lie within the space formed by the central section and end sections of the blank.

In that form of the invention illustrated in Figs. 12 to 14 the structure may be employed as an open edge container for merchandise, or structures to be displayed may be placed upon the inner surfaces of the central section 47 and end sections 48 and 49 as they appear in Fig. 13 of the drawings and upon one or both of the surfaces of the extension member 41. In a similar manner the portions 41 and 41b of the structure shown in Fig. 15 may be employed as supports for merchandise or articles to be displayed or to be held so as to be readily accessible for use.

In that form of the invention illustrated in Figs. 16 to 20 inclusive of the drawings the blank sheet 60 as shown in Fig. 16 is of similar construction to that shown in Fig. 7 of the drawings except that it is provided with an additional extension projecting outwardly from one edge of the central section. The sheet blank 60 is provided with a median fold line 61, a line of fold 62 for the end extension 63, and parallel lines of fold 64, 65, 66 and 67 for the extension sections 68 and 69. The blank may also be provided with transverse creases 70 and 71, similarly located relative to opposite ends of the blank, and has a rounded edge 72 located at one side of the end section 73 and the side edges 74 of the other end section 75 tapered, the central section 76 carrying the extensions 68 and 69.

In forming a packaging device from the blank 60 the blank is first bent along the median line 61 and longitudinal lines of bend 62, 64, 65, 66 and 67. The folded blank as shown in Fig. 17 may then be bent or rolled as along the transverse creases or bends 70 and 71, to form the end sections 73 and 75, and the central section 76, together with intermediate connecting sections 77 and 78, while the extensions 68 and 69 are connected to each other and to the central section 76 by intermediate fold sections 79 and 80.

In the formation of the structure as shown in Figs. 18 and 19, the extensions 68 and 69 are folded over the central section 76, and the end section 75 is then slipped within the opening 81 formed in the end section 73, so as to lock the end sections 73 and 75 together over the extension 68, as shown in Figs. 18 and 19, and provide a packaging means having one side edge thereof open to expose to view material contained therein. The packaging means thus formed may be closed by fitting the end extension 69 within the space contained between the central section 76 and the interlocked end sections 73 and 75, as shown in Fig. 20 of the drawings, to form a container or box-like closure wherein the container parts are retained in closed position by the interlocked end sections 73 and 75 and the central section 76.

In that form of the invention illustrated in Figs. 21 to 23 of the drawings, the sheet blank is similar to that shown in Fig. 12 of the drawings except that an extension is provided upon each side of the central section in such a manner that when the sheet blank is folded along its median line both extensions project from one side of the central section as shown in Fig. 21 of the drawings. In this form of the invention the folded blank provides a central section 82 and end sections 83 and 84 connected to the central section 82 by intermediate sections 85 and 86 respectively. The doubled extension 87 is connected to the central section by an intermediate section 88 and the extension section 87 as shown is provided with a second extension section 89 connected thereto by an intermediate section 90. In forming the completed device the extension section 87 is folded over the central section 82 in such a manner that the end extension 89 is infolded and the intermediate sections 90 and 88 form two of the side edges of the structure. The end sections 84 and 83 are then interlocked together, by forcing the end section 84 within the parts of the end section 83, whereby the end sections are interlocked and form a holding means for retaining the extension sections 87 and 89 in container forming position to provide a rectangular box-like structure the parts of which are held in closed position by the interlocking end sections 83 and 84.

In the slightly modified form of the invention shown in Fig. 24 one of the folds forming the extension sections 87 and 89 and intermediate sections 88 and 90 has been dispensed with to give the container structure a single thickness of material for the edge walls 88 and 90. It will be understood that either one or the other of these extension and intermediate section layers may be retained in the formation of the box-like container or they may both be employed as may be found desirable in practice.

It is to be noted that the various forms and embodiments of the invention as illustrated herein each comprises a combined cover and locking means formed by interfitting together the end portions of the folded sheet blank in such a manner as to positively lock the end sections together and form a cover for the container, when a container structure is embodied in the packaging device. Certain forms of the invention also disclose means such as the tabs 6 or recesses 19 whereby the edges of one of the end portions may be grasped in opening or closing the interfolded end sections. The packaging means is preferably formed from material possessing sufficient stiffness or rigidity so that the inherent stiffness of the material tends to hold the end sections in their interfitted position and prevent accidental separation of these parts. The tabs or openings formed in the edges of one of the end sections serve as convenient means for grasping the edges of the interfitted section to separate the end sections from each other for opening the package in forms of the invention similar to those illustrated in Figs. 1 to 6 of the drawings.

By forming the package from a single sheet folded in such a manner that substantially all of the external surfaces thereof are located upon one side of the sheet it is possible to employ a material having one finished surface and the opposite surface unfinished, or to print or lithograph one complete side of the sheet and so fold the sheet that the finished or printed side of the sheet will be substantially the only portion of the sheet exposed to view in the finished structure.

By providing a plurality of transverse fold lines, as for example, the fold lines 3, 4 and 5 of Fig. 1, the finished package may be folded in a variety of ways to form differently shaped containers after the manner illustrated in Figs. 2, 4 and 6 of the drawings.

The tabs 6 and openings 19 are preferably so positioned that the part of the interfitted end section to be grasped in opening or closing the end sections is a portion located adjacent to the free end of the interfitted end section in order to facilitate the separation of the end sections and make their interposition more positive by exerting force thereon at a point adjacent to the free end of the interfitted section.

In all forms and embodiments of the invention the end sections of the doubled material are preferably of substantially equal lengths and of slightly less length than the central section so that when interfitted together they are substantially coextensive with each other thus tending to be held in interlocked position by reason of the stiffness of the material and the force exerted thereon by the central section when they are in interfitted relation.

The manner of interlocking the end sections as herein described is adapted to be employed readily in connection with a variety of forms of packaging means, such as the tubular or hollow packaging means, or packaging means of a rectangular shape having an extension member folded over beneath the interfitting end sections, or a box-like container having extension means of such length as to be capable of being folded beneath the interfitting end sections to form a closed container of box-like form which is normally held in closed position by the interfitting end sections.

What I claim is:—

1. A packaging and display means for merchandise consisting of a single sheet of relatively stiff material folded substantially along the central longitudinal line thereof to provide at least a double thickness of the sheet material for the walls throughout their extent and having two groups of spaced creases formed therein for separating the sheet into a central section and opposed end sections, said creases being arranged at substantially right-angles to the longitudinal fold line whereby the sections may be folded to form either a flat or a tubular container, one of said end sections being interfitted between the thicknesses of the opposite end section to bring the longitudinal fold lines of the end sections into substantial coincidence and retain the interfitted end sections in interlocking relation with each other and normally maintain the walls in merchandise holding position.

2. A container forming blank comprising a continuous sheet of relatively stiff fibrous material having a main body portion provided with a median fold line extending substantially centrally of the main body portion in a direction longitudinally thereof and having a plurality of creases extending transversely of the median fold line to form central and end sections, wherein the sections oppositely positioned with reference to the median fold line are substantially co-extensive with each other when the parts of the blank are folded together along the median fold line, and a lateral extension integral with the main body portion of the blank and extending from one side edge thereof, the line of jointure of said lateral section with said blank being defined by a fold line.

3. A packaging means comprising a tubular container having oppositely positioned side and end walls, the end wall and one side wall each consisting of a double thickness of relatively stiff sheet material folded together along one free edge of said side walls and provided with transverse bends defining the meeting edges of adjacent side and end forming sections, the other of said side walls consisting of duplicate sections interfitted together one within the other and normally held in interfitting relation by the inherent stiffness of the material, and a portion carried by the innermost interfitting section and so positioned as to project outwardly of a portion of the outermost of the interfitting section when the sections are in interfitting relation.

4. A packaging means comprising a tubular container having oppositely positioned side walls separated from each other at one end thereof by an end wall to provide a merchandise-receiving opening extending therethrough and defined by said walls, one side wall and the end walls each consisting of a double thickness of sheet material folded together along one free edge of said walls and having transverse bends defining the meeting edges of said side walls with each other and with the end wall and separating the sheet into sections, the opposed end sections of the folded material being interfitted together to form the other of said side walls and normally held in interfitting relation by the inherent rigidity of the material while capable of separation to open the packaging means, and means carried by one of the interfitting sections and projecting beyond the adjacent edge of the other interfitting section for facilitating the separation of the interfitting section.

5. A packaging means comprising a rectangular container having oppositely positioned side walls and two opposed end walls connecting adjacent edges of the side walls, one side and the end walls consisting of a double thickness of sheet material folded along one free edge of said side and end walls, the other side wall consisting of interfitted end portions of the sheet material, and an extension section of sheet material integral with the first-named sheet material and projecting outwardly from one side edge thereof in position to be folded over between said oppositely positioned side and end walls to provide a merchandise-supporting member removably positioned within the container.

6. A packaging means comprising a rectangular container having oppositely positioned side walls and opposed end walls connecting adjacent edges of said side walls, one side and the end walls consisting of a double thickness of sheet material folded along one free edge of said side and end walls and having end sections interlocking together to form the other of said side walls and maintain the parts in container-forming relation, and a foldable section integral with the sheet material and foldable upon itself to fit within the space defined by said side and end walls and form therewith a closed rectangular container.

7. A packaging means comprising a rectangular container having integral side and end walls formed from a sheet of bendable material, and side and end walls formed from a double thickness of said sheet material and arranged to enclose said first-named side and end walls, with the second-named end walls located at right-angles to the first-named end walls, said several side and end walls being all formed from a single sheet of bendable material and integral throughout.

GEORGE J. HARRIS.